Oct. 23, 1962 C. L. EDDLEBLUTE 3,059,293
TRUSS CONNECTION
Filed March 28, 1961 3 Sheets-Sheet 1
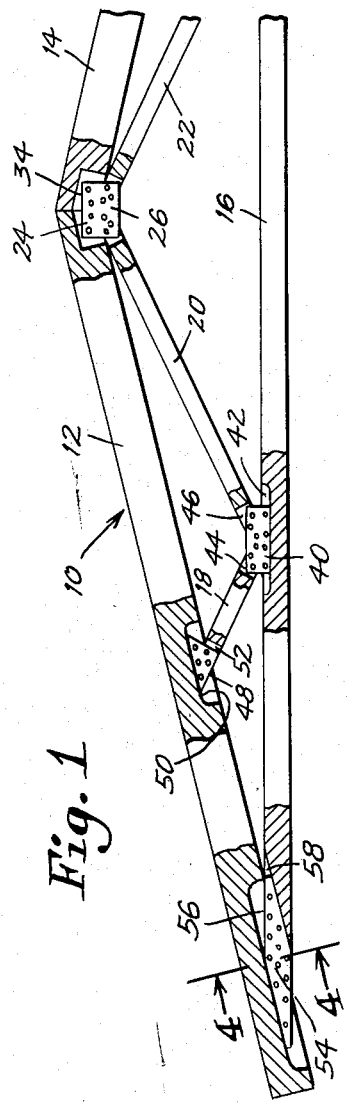
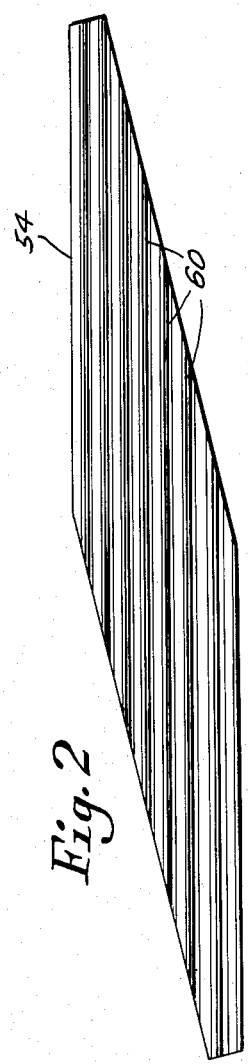
INVENTOR
Carl L. Eddleblute,
BY Diggins + LeBlanc
ATTORNEYS Oct. 23, 1962 C. L. EDDLEBLUTE 3,059,293
TRUSS CONNECTION
Filed March 28, 1961 3 Sheets-Sheet 2
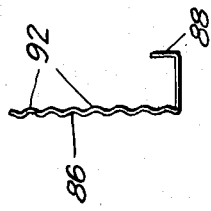
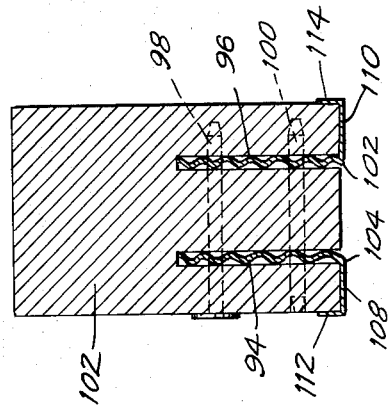
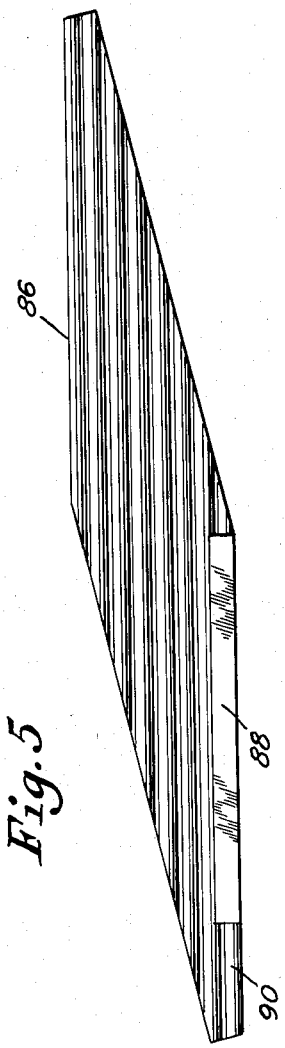
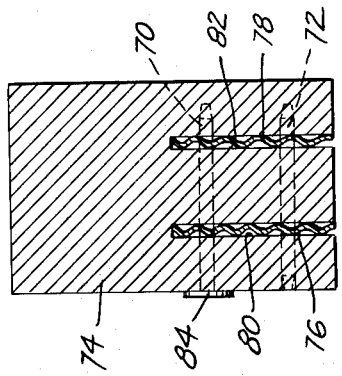
INVENTOR
Carl L. Eddleblute,
BY *Diggins + Le Blanc*
ATTORNEYS Oct. 23, 1962 — C. L. EDDLEBLUTE — 3,059,293
TRUSS CONNECTION
Filed March 28, 1961 — 3 Sheets-Sheet 3
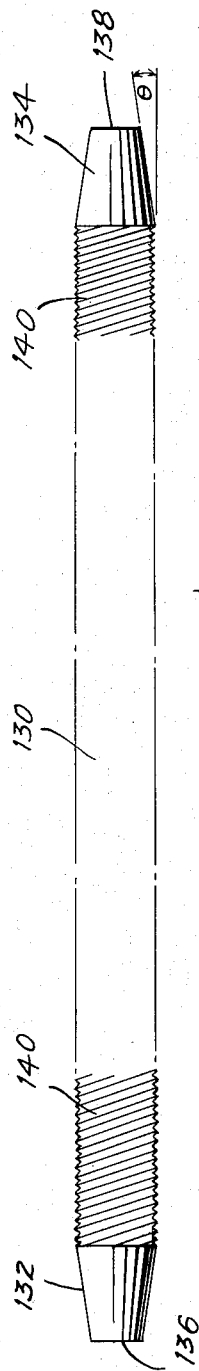
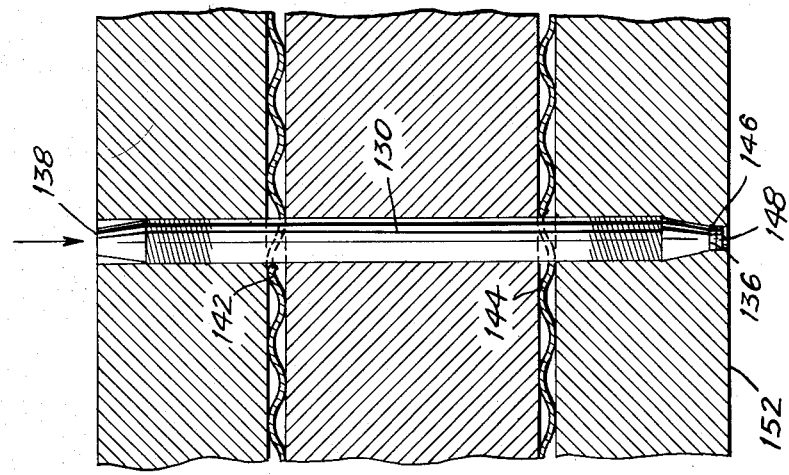
INVENTOR
Carl L. Eddleblute,
BY Diggins + Le Blanc
ATTORNEYS 2,959,293
TRUSS CONNECTION
Carl L. Eddleblute, P.O. Box 700, Perry, Fla.
Filed Mar. 28, 1961, Ser. No. 98,927
3 Claims. (Cl. 20—92)

This invention relates to the connection of commercial framing lumber into structural frame and/or truss arrangements for economical use in residential and light commercial construction, and particularly to the splice plates and connector pins whereby this is accomplished.

The critical problem in all timber or lumber connections is the loss of cross section imposed on the various wood members to accommodate the splicing means by which the stresses borne by the members are transferred from the full section of the wood members through the connecting media to the complementary members or splice plates. Maximum utility and structural integrity require that those stresses be uniformly collected from the full section of the members and so distributed and/or transferred through the splicing media.

At present, other wood connections that resemble my invention with multiple gusset plates of steel or other materials are known to the art, but due to various shortcomings inherent in their design or because of elaborate processing procedure, have not been and are not used to any known appreciable extent. In the current surge of national interest in structural assembly of common framing they have been totally ignored because of those shortcomings.

One of those methods involves the use of solid timbers (not lumber, but heavy timber classification) as chords with parallel gussets or splices of steel or other material in corresponding slots. The load or stress is transmitted by bolts or dowels going through holes opposite each other in the wood member and in the gusset plates. As a bolt cannot be fitted so tight in a hole drilled through separate members that a direct stress transmission can take place uniformly along the bolt, a major disadvantage is present.

Furthermore, in a joint using several bolts it is well known that stress transmission does not take place uniformly among all the bolts, thereby introducing appreciable inelastic deformation to such joints until such deformation has distributed the bearing more equally. Such adjustment contributes to overstress in portions of the joint (even exceeding elastic limits) invalidating original design assumption.

Another method proposes to remedy this by making up the assembly and boring the bolt or pin holes with a steel cutting drill bit mounted in an electric hand drill. The character of a steel drill bit, common knowledge to those who employ its use, does not contribute to accurate holes in wood and where a steel plate or other dissimilar material such as the splice plate gusset is encountered, that dissimilarity causes additional eccentricity or wobble, which destroys the close fitting alignment sought. Such eccentricity enlarges the holes in an irregular pattern that produces the same problem of inelastic joint slip or movement that overloads some parts of the assembled connection is is found in independently bored bolt holes.

A third method verifies the above disadvantages and introduces a third material (rigid setting plaster of Paris) to surround a pin that extends through extra large holes drilled in the wood without direct contact, all contact to be transferred through the filler which must be introduced after joint assembly. An awareness of the doubtful integrity of this cement is displayed by the requirement that the holes bored in the wood be sealed against moisture transmission, a difficult procedure which also requires time delays to permit setting or drying out. The cementitious fillers are water pregnable and susceptible to attack by normal atmospheric vapor conditions and cannot be depended upon for uniform performance through the many years service that are expected of timber or truss constructions. Another disadvantage is the necessity to use larger than normal timber sizes to provide replacement in the connector area for the material removed by the oversize holes.

Another disadvantage is the result when temperature variation causes the pin to shrink, destroying the uniform bearing on the crystalline filler and the resultant concentration of stress shatters the rigid filler against the more flexible backing of the wood wall. Plastic fillers are not suitable as they will cold flow under the unrelenting bearing stresses.

Another disadvantage is that once the assembly is complete and the filler set up the complete truss must be removed to its final placement, here the twisting stresses will destroy the brittle fillers unless elaborate precautions are established to maintain the assembly in an unchanging plane during the transfer. Thus it is evident why this design is unknown in commercial practice. As with other constructions which employ rigid cements for stress transmission between wood truss members the integrity of such assemblies historically leaves much to be desired.

Another connection relates to use of a fluted, barbed wedge to produce a torsion resistant assembly. The double taper of this proposed pin however effectively destroys any joint in which it might be used, by splitting action alone. The only material it might be used in successfully would seem to be rubber.

Engineering tests reveal that the splitting around such pin connectors must be rigidly limited to provide uniform joint integrity. The wedge can be rendered effective solely by elaborate preparation of predrilled and specially shaped holes that can control the splitting action induced when the wedge is inserted.

Other known connections involve metal plates or gussets applied externally on the exposed surfaces of the connected members by pins, nails or teeth which must transfer the load through a limited portion of the connector pin. It is established by the Forest Products Laboratory of the U.S. Department of Agriculture that the allowable design load is provided by a connector length from the plane of shear equal to 3.5×the effective diameter for screws, or 3×the diameter for bolts, drift pins, etc. Nail loads are derived from empirical formulae which are based on that fundamental fact. Additional connector lengths from one plane yield only a minimal increase in allowable loads where the end of the connector is borne in the wood.

My invention is the result of a search for a connection that provides stress distribution surely and equally throughout the connector area, that can be simply fabricated and will provide permanently reliable joining with an absolute minimum of inelastic slip common to all mechanical joining except high cost "reamed steel fitting," welded construction or glued wood construction. To accomplish this it required overcoming the disadvantages of the known methods.

The known methods using multiple plates inserted in slots and secured by various bolts, pins, dowels or wedges involve many expensive steps. They demonstrate the need for improvement and simplification, improvement in the preparation of a close fitting connector hole, a means of retaining continuous bearing of the connector on the wood and metal splice, and elimination or reduction of splitting forces.

It is therefore a primary object of this invention to provide an economical connection that provides a minimum of elastic slip in any assembled joint thereby permitting the design and construction of low pitch trusses of predetermined performance and capacity.

Another object is to provide a form of connector pin that is a self-drill with the capacity of forming a uniform bearing throughout its length when inserted through a connector area.

Another object of this invention is to provide a form of gusset or splice plate that permits elimination of usual predrilling operations and offers minimum resistance to insertion of connector pins used as self drills or punches.

Another object of this invention is to provide a form of driven connector pin that eliminates splitting of the thinner leaves of the slotted member.

Another object of this invention is to provide support for the thin outer leaves of the slotted members by frictional restriction on the connector pin body.

Another object of this invention is to provide extra metal splice plate capacity and flanged support for the outer leaves in certain high stress or service conditions.

Another object of this invention is to provide uniform permanent connector bearing on the wood member without resorting to any fillers of any form.

Another object of this invention is to provide connection with minimum removal of material from the connected members.

These and further obects and advantages of the invention will be more apparent upon reference to the following specification, claims and appended drawings wherein:

FIGURE 1 is a side elevation, partly in section, of a truss embodying the novel gusset plate connection of the present invention;

FIGURE 2 is an enlarged front view of one of the metal gusset plates shown in FIGURE 1;

FIGURE 3 is an end view illustrating the corrugations formed in the gusset plate of FIGURE 2;

FIGURE 4 is an enlarged cross-section through one of the gusset plate connections of FIGURE 1;

FIGURE 5 is a front view of a modified corrugated gusset plate;

FIGURE 6 is an end view of the gusset plate of FIGURE 5;

FIGURE 7 is a cross-section through a connection similar to FIGURE 4 incorporating the modified gusset plate of FIGURES 5 and 6;

FIGURE 8 is an enlarged view of one type of nail usable in the present invention;

FIGURE 9 shows a preferred form of nail usable in the truss connection of the invention; and FIGURE 10 shows an enlarged cross sectional view of a truss connection employing the preferred nail of FIGURE 9.

Referring to FIGURE 1 of the drawings, a trussed rafter is shown generally at 10 and consists of rafters 12 and 14, joist 16 and truss brace members 18, 20 and 22. The rafters 12 and 14 are joined at the peak of the truss by means of a joint 24 which includes a pair of gusset plates one of which is illustrated at 26 received in a pair of slots in the ends of the rafters in the manner shown in FIGURE 4. The gusset plates are secured to the rafters by means of nails 34. According to the invention, the same gusset plate 26 which joins rafters 12 and 14 extends below these rafters to be received in corresponding slots in braces 20 and 22 which contact the underside of the rafters 12 and 14.

The lower ends of truss brace members 20 and 22 are fastened to the joist 16 by means of gusset plates 40 which are received in slots 42 in the joist and in slots 44 and 46 in braces 18 and 20 respectively. The upper end of brace 18 is fastened in a similar manner to rafter 12 by means of a gusset plate 48 received in a slot 50 in rafter 12 and in a slot 52 in brace 18. The joist 16 is joined to the rafter 12 by means of large gusset plates such as 54 nesting in slots 56 in rafter 12 and in corresponding slots 58 in joist 16.

The truss rafter 10 formed in this manner is a single plane rafter having joints which will resist a far greater hurricane suction force than will a conventional framed roof containing collar beams due to the quadruple improvement of bearing on each connector nail which is locked in place by the grip of the metal plate and will not vibrate loose or tend to loosen as do nails loaded on one end only. The single plane construction results in all the truss members lying flat in one plane with no lapped joints, thereby giving a balanced construction with a high connection efficiency and minimum storage problems.

While it is possible to utilize nails either with or without heads in the joints of the present invention, according to the preferred embodiment, connector nails are used with sufficient stiffness to sustain the slightly increased cantilever action desired. One satisfactory type of nail 120 shown in FIGURE 8 is formed with a sharply tapered point 122 and grooves 124 which effect a drilling action when inserted by a hammer or suitable press into the assembly. The grooves 124 are only slightly spiraled. This latter construction tends to restrain external portions of the slotted wood from springing open under erection loads while at the same time providing a drilling action into the wood. Furthermore, the long pitch spiral nature of the grooves 124 does not significantly decrease the sectional modulus of the nail as a beam nor provide sharp notches or annular sectional decreases that would tend to contribute to failure under bending loads. With the joint connector pin or nail 120 loaded laterally, the load applied serves to more securely lock the nail in place as the load increases.

An important feature of the present invention involves the utilization of corrugated gusset plates such as plate 54 illustrated in FIGURE 2. The plate is formed with a plurality of corrugations 60 which, as shown, run parallel to each other horizontally across the entire surface of the gusset plate. These corrugations increase the section modulus of the connections and act to stiffen the whole truss assembly.

A major purpose of the corrugations, however, is to fill up the slots or kerfs formed in the wood members to be connected, and provide firm bearing for the outer leaves of the slotted member during the driving of the connector to reduce the vibration of impact that occurs during the driving action and contributes to splitting of the wood. It has been found that while flat metal sheets have adequate load bearing properties when used in connections of this type, they present serious sawing problems which have substantially detracted from the otherwise economical features of the truss joints. It has been found that it is extremely difficult to saw a deep narrow kerf or cut in the wood to be joined less than $\frac{1}{16}$ of an inch wide. In order to obtain such narrow saw cuts it is necessary to use expensive, specially tooled saw blades and even then breakage and blade wobble create substantial manufacturing problems in the formation of narrow kerfs or slots.

On the other hand, the utilization of wider slots requires an unnecessarily thick gusset plate with an accompanying waste of metal and increased cost. In addition, thicker plates are more difficult to penetrate. The remaining alternative is to have the gusset plate loosely received within the saw cut or kerf where it is free to bend and twist and to move laterally and longitudinally along the joining nails, thus substantially reducing the load bearing capacity of the gusset plate connection.

By providing $\frac{1}{16}$-inch corrugation in a 22-gauge metal sheet, it has been found that it is possible to utilize the thicker saw blades and at the same time receive the less thick gusset plates tightly and snugly within the slots formed in the wood. At the same time, the plates are substantially strengthened and the section modulus increased.

FIGURE 4 illustrates a cross-section through a typical gusset plate connection wherein a pair of nails 70 and 72 pass through a wooden member 74 containing corrugated gusset plates 76 and 78 snugly received within saw kerfs 80 and 82. While the metal gusset plates 76 and 78 are substantially thinner than the saw kerf, the corrugations provided therein act to completely fill the kerf so that the gusset plates are snugly and tightly received in the saw slots which may be formed by the more conventional wider saw blades. The connecting nail 70 is indicated as having a head 84 whereas nail 72 is shown without a head. It is apparent that the connector nails or pins may all be formed with heads, all without heads, or a combination of the two types may be utilized as desired.

FIGURES 5 and 6 illustrate a modified gusset plate 86 similar to plate 54 of FIGURE 2 with the exception that gusset plate 86 is provided with a U-shaped channel 88 along a portion of its lower edge 90. Gusset plate 86 is similarly formed with corrugations 92.

FIGURE 7 illustrates a connection similar to FIGURE 4 wherein a pair of gusset plates 94 and 96 similar in construction to plate 86 of FIGURE 5, are used to join the wooden members. Connectors 98 and 100 similarly pass through a wooden member 102 and through the gusset plates 94 and 96 received in the relatively wide saw kerfs 104 and 106. Lower channels 108 and 110 are bent around the ends of wooden member 102 and the outer flanges thereof 112 and 114 in the preferred embodiment extend approximately ¼ inch upwardly along the sides of wooden member 102. While the basic embodiment in FIGURE 4 is satisfactory for joints in the lower stress load range, the modification of FIGURE 7 has increased strength and is more satisfactory for the higher stress load ranges, and provides added joint strength for higher shear.

FIGURE 9 illustrates a preferred form of nail substantially improving over the more conventional type illustrated in FIGURE 8. While the nail construction of FIGURE 8 provides satisfactory economical connections in certain applications involving low stress loads the construction of FIGURE 9 is superior and significantly contributes to the very substantial increases in load bearing properties of the truss connections of this invention. The nail 130 is shaped with a pin like shaft of circular cross section preferably formed from high carbon steel. Each end of the nail shaft is tapered to form a truncated cone 132 and 134 terminating in relatively blunt transverse end faces 136 and 138 of circular configuration. As shown the nail is double ended and may be driven from either end. It is understood that in certain cases it may be desirable to form the nail 130 with only one tapered end while at the same time providing the opposite end with a flat head of the type illustrated in FIGURE 8.

Formed over the entire outer surface of the shaft of nail 130 is a small gauge spiral groove 140 preferably having approximately thirty two turns to the inch. The truncated ends 132 and 134 of the nail are preferably tapered for a length less than one diameter of the shaft and terminate in flat end faces 136 and 138 which are substantially at right angles to the longitudinal axis of the nail. Angle $\theta$ defining the tapered end portion should not exceed 10° and preferably ranges from 5 to 10°. A particularly satisfactory nail has been utilized having a taper angle $\theta$ of 7½°.

FIGURE 10 shows an enlarged partial cross section through a joint incorporating a preferred nail construction of the type illustrated in FIGURE 9. The nail is shown as driven through corrugated gusset plates 142 and 144 in the direction of the arrow in FIGURE 10. In passing through the gusset plates nail 130 punches out a pair of circular metal discs 146 and 148 which are carried by the end face through the wood in advance of the nail. The length of the nail should be chosen so that when the nail is completely driven with end face 138 flush with the wood surface 150 the opposite end face 136 and discs or punch outs 146 and 148 stop just short of the lower wood surface and are not visible from this latter surface.

This blunt end nail formation provides the ability for the nail to penetrate the wood fiber without the splitting action of commercial wedge pointed nails. The flat end face acts as a punch to clear out part of the wood fiber and the taper area of the nail presses aside the balance of the wood fiber into the surrounding wood.

It is apparent from the above that the present invention provides a novel light weight structural lumber joint and load bearing connection completely obviating many of the difficulties evidenced by prior constructions. In the present invention the inserted plates provide a multiplicity of shear planes with the opportunity to distribute the wood bearing within the efficient connector lengths established by Forest Products Laboratory. My research and experiments led to the problem of an efficient drilling method that would provide a bearing for the connector pin equal to that sought by the cement fill method, directly on the splice plate or gusset and the wood members alike. Another problem was the limitations of slotting equipment to provide slots for the plates. With heavy timber members the plates are proportionately thicker and thick slotting saws can be used. Using light structural members such as 2 x 2, 2 x 3, 2 x 4, 2 x 6, etc. of commercial standards the metal plate to wood ratio naturally indicates light metal gauges such as #22 or #20. With the thinnest slotting saw, capable of continuously producing the required depth of slot to accommodate the necessary plate area, limited to a minimum .0625" thickness a firm joint indicates a metal plate of comparative thickness. Driving the pin through the thick plates requires a very high impact force. When driven through the 7/16" outer leaf of a slotted 2" member the resistance of the thick plate induces secondary forces and vibration that invariably splits the outer leaves and occasionally the central thicker (⅝") portion or leaf of the slotted member. With the lighter plates this impact reaction is significantly reduced and seldom results in splitting of even the thin outer leaves. Experiment showed that corrugation or upsetting of the plate provides a gradual shearing action to the impact of the punch on the plate and results in further decrease in impact reaction and tendency to split. Forming the corrugations to fill the sawed slots as shown in the drawings in combination with the drill/punch connector pin of FIGURE 9 produces the improved arrangements and construction to accomplish the connection efficiency required where the straight shank of the connector eliminates continuous wedge action destructive to the straight grain texture of structural woods which split more easily under such conditions. The flat blunt point therefore provides the ability to penetrate the wood with a non-splitting action.

The short tapered section provides a compressing action on the wood in the walls of the hole produced to provide firm bearing for the connector to wood bearing.

The flat blunt point penetrating the wood under driven or pushing action encounters the connector plate as a punch in a punch press. The wood member provides a cushion support on the opposite side, the corrugation provides an angled shearing contact and the flat point punches out a small disc of metal, which is driven ahead of the pin as it proceeds through the assembly.

The short tapered area of the pin swages or spreads this punched hole to a firm close contact for the pin to plate bearing. This taper must be of such degree that it accomplishes two separate fitting actions smoothly and firmly. It is not intended to produce burrs or other projections. It is to provide a firm bearing closely approaching that of a reamed hole. Tests have shown that such closely fitted holes without burrs provide maximum bearing values. As the punch pin connector proceeds through the assembly to the next plate the punched out plug is driven ahead of it and does not interfere with the succeeding punch drill actions.

The fine spiral grooves are provided to help frictionally retain and support the thinner outer leaves of the slotted member and hold them against the stresses imposed by handling, transport, and erection. Those grooves are to be at a sufficient angle to the axis of the shaft to insure continuous bearing across the connector plates where an annular groove would provide a sharp notch action and reduction in section modulus of the connector-pin punch.

The gusset or splice plates are closely corrugated or otherwise upset or embossed to provide slot fill and support for the wood member leaves on either side of the slots. Corrugations parallel to the lines of stress developed in the completed joint are preferred as this adds considerably to the stiffness of the assembled structure, by increasing the section modulus of the plates. The thinner plate section reduces driving effort and the attendant secondary force reactions that promote splitting. The corrugation permits shearing entry of the punch/connector which further reduces those splitting reactions. The filled slot relieves the problem of splitting where a plate edge parallels the grain in unslotted wood and the driving forces tend to close a partially filled slot and induce splitting parallel to and at the slot bottom.

The connector pins may be punch shaped on both ends or may have various very small heads on one end to be accommodated by various driving mechanisms that can be utilized for fabrication.

This construction provides the maximum reduction for procedures in the assembly of completed units. It can be inexpensively established in any wood working shop, from a basis of two men to any anticipated production set-up. It can be employed by a vast majority of the persons or companies currently interested in this type of fabrication. Assembly can be accomplished with hand hammer, air operated drivers, multiple press or automatic nail machines.

The invention reduces the manufacturing process to cutting-slotting, bench lay-up and application of connectors from one side only.

This invention further provides firm uniform bearing throughout the connector pin, pin group and plate and member areas of the joint. Providing continuous bearing of the connector on the wood, free from withdrawal and shrinking stresses, it yields 4.75 times the load otherwise allowable on the same diameter connector in conventional usage. It makes available to the small fabricator in isolated areas, efficiencies and manufacturing quality heretofore, available only in areas of high volume and large capital investment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a wood connection, a first high stress bearing wooden member having a substantially flat surface, a second high stress bearing wooden member having a substantially flat surface adjoining said flat surface of said first stress bearing member, said first stress bearing member having a pair of parallel slots in said surface thereof adjacent to said second stress bearing member, said second stress bearing member having a pair of corresponding slots in said surface thereof in alignment with the slots in said first stress bearing member, a pair of corrugated metal plates extending into the respective slots in both stress bearing members, the corrugations of said plates extending over the entire area of said plates and imparting an overall width thereto filling the width of said slots, and a plurality of nails driven through said stress bearing members and plates at substantially right angles thereto forming by swaging action as the nails penetrate the metal plates a load bearing area immediately surrounding said nails, said nails having blunt, conically tapered driven ends and being forced to create their own apertures through said members and plates whereby said nails penetrate said metal plates removing therefrom by a shearing punch action a small circular section of metal, the tapered section of said nails swaging out the resulting opening to form a tight bearing between said plates and the straight portion of said nails, said nails constituing the sole means connecting said plates with said wooden members.

2. Apparatus according to claim 1 wherein said plates are formed of 22-gauge metal and said slots are 1/16-inch wide.

3. Apparatus according to claim 1 wherein at least one of said corrugated plates includes a channel section formed along at least a portion of one edge thereof, said channel section extending beyond the slot in which said plate is received and overlying a portion of two adjacent perpendicular surfaces of said wooden member.

References Cited in the file of this patent

UNITED STATES PATENTS

| | | |
|---|---|---|
| 2,840,014 | Wadsworth | June 24, 1958 |
| 2,858,584 | Gaines | Nov. 4, 1958 |
| 2,894,291 | Sorenson | July 14, 1959 |

FOREIGN PATENTS

| | | |
|---|---|---|
| 17,633 | Great Britain | Dec. 23, 1909 |
| 179,840 | Great Britain | May 18, 1922 |
| 128,254 | Austria | May 25, 1932 |
| 730,259 | Germany | Jan. 8, 1943 |
| 257,965 | Switzerland | May 2, 1949 |
| 71,061 | Denmark | May 15, 1950 |